United States Patent

Kamo et al.

Patent Number: 5,884,108
Date of Patent: Mar. 16, 1999

[54] DATA IMPRINTING OPTICAL SYSTEM

[75] Inventors: Yuji Kamo; Hideyasu Takato, both of Hino; Yuji Miyauchi, Machida, all of Japan

[73] Assignee: Olympus Optical Co., Ltd., Tokyo, Japan

[21] Appl. No.: 868,806

[22] Filed: Jun. 4, 1997

[30] Foreign Application Priority Data

Jun. 4, 1996 [JP] Japan ................................. 8-141524

[51] Int. Cl.⁶ .................................................. G03B 17/24
[52] U.S. Cl. .......................................... 396/315; 396/318
[58] Field of Search .................................. 396/310, 315, 396/318

[56] References Cited

U.S. PATENT DOCUMENTS

| | | | |
|---|---|---|---|
| 3,736,849 | 6/1973 | Thompson | 396/315 |
| 3,744,391 | 7/1973 | Plummer | 396/152 |
| 5,389,991 | 2/1995 | Naka et al. | 396/315 |
| 5,617,162 | 4/1997 | Kato et al. | 396/318 |
| 5,678,084 | 10/1997 | Hori | 396/317 |
| 5,740,483 | 4/1998 | Hashimoto et al. | 396/315 |

FOREIGN PATENT DOCUMENTS

| | | |
|---|---|---|
| 4-256918 | 9/1992 | Japan. |
| 6-035061 | 2/1994 | Japan. |
| 7-104370 | 4/1995 | Japan. |

*Primary Examiner*—Russell Adams
*Attorney, Agent, or Firm*—Pillsbury Madison & Sutro LLP

[57] ABSTRACT

A data imprinting optical system that records a date, data, etc. on a predetermined surface, e.g. a film in a camera, uses a diffractive optical element to achieve savings in space and a reduction in cost. The data imprinting optical system has a display device (1a) and imprints an image displayed on the display device (1a) onto a predetermined surface (1c). The optical system has a diffractive optical element (1b). The diffractive optical element (1b) may have a plurality of different image-formation points to enable a plurality of data imprinting modes. The diffractive optical element (1b) may be integral with a part of another optical system, e.g. a photographic optical system.

34 Claims, 10 Drawing Sheets

FIG. 19
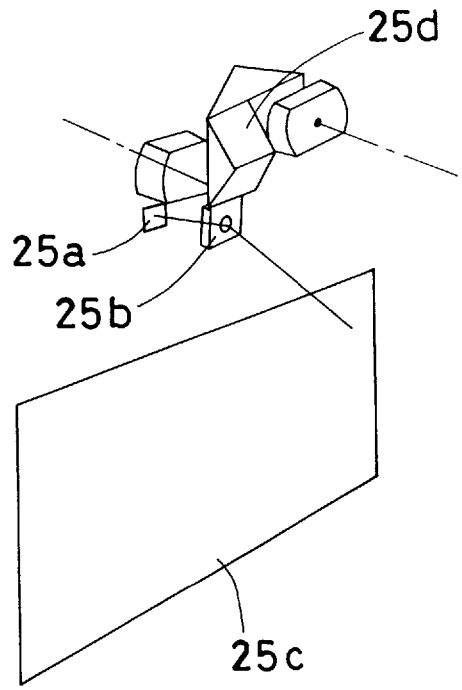
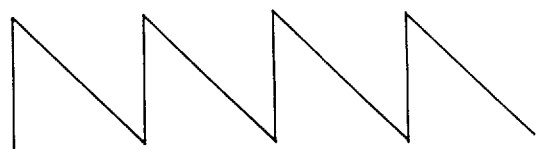
FIG. 20(a)
FIG. 20(b)
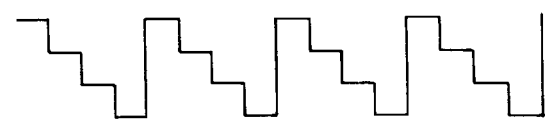
FIG. 20(c)
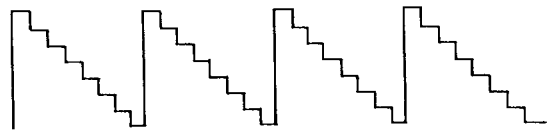
FIG. 20(d)

DATA IMPRINTING OPTICAL SYSTEM

BACKGROUND OF THE INVENTION

The present invention relates to a data imprinting optical system and, more particularly, to a data imprinting optical system capable of imprinting date and other information on the surface of a film used in a camera, for example.

A conventional data imprinting optical system is disposed behind a film. Because the conventional arrangement causes the camera body to become undesirably thick, there have recently been proposed data imprinting optical systems designed to imprint data from the front side of the film.

For example, Japanese Patent Application Unexamined Publication Number [hereinafter referred to as "JP(A)"] 4-256918 proposes a retrofocus type data imprinting optical system comprising two lenses. JP(A) 7-104370 proposes a data imprinting optical system wherein an optical axis is bent by a prism. Recently, data imprinting optical systems adapted for panoramic photography have also been proposed in which the image frame size is changed by cutting upper and lower end portions of the film. For example, in JP(A) 6-35061, two lenses are arranged in parallel to each other so as to be selectively used for ordinary photography and panoramic photography. In JP(A) 7-295066, two prisms are arranged in parallel to each other so as to be selectively used for ordinary photography and panoramic photography. In JP(A) 7-287295, a lens is inserted to cause a magnification to change between ordinary photography and panoramic photography.

To provide a data imprinting optical system in front of a film in a camera, it must be disposed in a photographic lens, a finder optical system, an autofocus system, etc. This hinders achievement of further reductions in the size and cost.

In JP(A) 4-256918, the back focus of an objective lens is lengthened to increase the degree of freedom with which a data imprinting optical system can be disposed in a camera or the like. However, the number of constituent members increases, which is disadvantageous from the viewpoint of cost.

In JP(A) 7-104370, the optical axis is bent by a prism to increase the degree of freedom with which a data imprinting optical system can be disposed in a camera or the like. However, the constituent member is larger in size than a lens, which is disadvantageous from the viewpoint of space.

Recently, there has also been proposed a data imprinting optical system that imprints data on a plurality of positions as in panoramic photographs, for example. In this case, extra members and space are needed to effect imprinting on a plurality of positions. JP(A) 6-35061 uses two lenses and hence causes the number of constituent members to increase and also causes the required space to increase, undesirably. JP(A) 7-295066 uses two prisms; therefore, the number of constituent members increases, and the required space also undesirably increases. JP(A) 7-287295 proposes a data imprinting optical system improved in terms of space in comparison to the above two conventional techniques. However, the problem of the increased number of constituent members still remains unsolved.

SUMMARY OF THE INVENTION

In view of the above-described problems associated with the conventional techniques, an object of the present invention is to provide a data imprinting optical system that indicatively records a date, data, etc. on a predetermined surface, e.g. a film used in a camera, wherein a diffractive optical element is used to achieve savings in space and a reduction in cost.

To attain the above-described object, a first data imprinting optical system according to the present invention has a display device and is arranged to imprint an image displayed on the display device onto a predetermined surface. The data imprinting optical system has at least one diffractive optical element.

A second data imprinting optical system according to the present invention has at least one diffractive optical element. The diffractive optical element has a diffracting action by which the direction of an optical axis is changed.

A third data imprinting optical system according to the present invention has a display device and is arranged to imprint an image displayed on the display device onto a predetermined surface. The data imprinting optical system has at least one diffractive optical element which has at least one reflecting surface.

A fourth data imprinting optical system according to the present invention has a display device and is arranged to imprint an image displayed on the display device onto a predetermined surface. The data imprinting optical system has at least one diffractive optical element which has a plurality of different image-formation points to enable a plurality of different data imprinting modes.

A fifth data imprinting optical system according to the present invention has a display device and is arranged to imprint an image displayed on the display device onto a predetermined surface. The data imprinting optical system has at least one diffractive optical element which is integral with a part of another optical system.

The reasons for adopting the above-described arrangements in the present invention, together with the functions thereof, will be explained in the following examples. It should be noted that the diffractive optical element is discussed, for example, in "Optics" Vol. 22, pp. 126–130 (Yuzo Ono). The diffractive optical element has an image-forming action as in the case of a lens. The image-forming action is available not only for first-order diffracted light but also for second- or higher-order diffracted light.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 19 is a conceptual view showing a data imprinting optical system according to Example 19 of the present invention.

FIGS. 20(*a*), 20(*b*), 20(*c*) and 20(*d*) show sectional configurations usable for diffraction surfaces of diffractive optical elements.

DESCRIPTION OF THE PREFERRED EMBODIMENTS

Example 1 relates to the first data imprinting optical system according to the present invention, which uses a diffractive optical element.

EXAMPLE 1

Figure 1A:
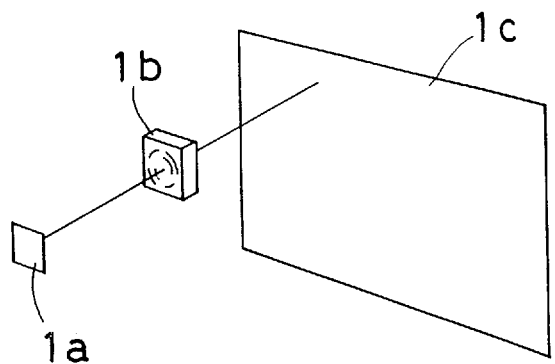
FIGS. 1(*a*) and 1(*b*) are conceptual views showing a data imprinting optical system according to Example 1 of the present invention.
Figure 1B:
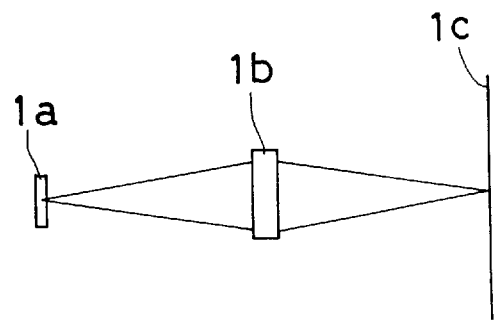

FIGS. 1(*a*) and 1(*b*) are conceptual views showing a data imprinting optical system according to Example 1 of the present invention. FIG. 1(*a*) is a perspective view, and FIG. 1(*b*) is a sectional view. In Example 1, imprinting of data is effected by a diffractive optical element having an image-forming action. In the figures, reference character 1*a* denotes a display device 1*a* that displays data; 1*b* denotes a diffractive optical element having an image-forming action; and 1*c* denotes a film surface. Data displayed on the display device 1*a* is imaged on the film surface 1*c* through the diffractive optical element 1*b*.

The conventional data imprinting optical systems use a refracting optical element to perform an image-forming action. The surfaces of refracting optical elements are given a curvature in order to refract light. Therefore, in the case of a convex lens, the thickness becomes thinner as the distance from the center increases toward the edge of the lens, and the center thickness of the lens must be set at a relatively large value in order to ensure the required thickness for the edge of the lens. In contrast, a diffractive optical element can be given a lens action by appropriately arranging the diffraction grating pitch on the diffraction surface. Therefore, it is possible to form a diffractive optical element having a lens action using flat surfaces on both sides thereof, as in the case of the diffractive optical element 1*b* shown in the figures, without a need of giving a curvature to neither of the surfaces. Accordingly, it is possible to form a lens thinner than the conventional one. If a diffraction surface having a positive power is provided on a convex refracting surface so that the diffraction surface shares the required positive power with the refracting surface, the curvature of the convex surface can be made weaker than that of the conventional lens. Therefore, it is possible to achieve a reduction in the thickness.

There have been cases where once an object point position, an image point position and an image-formation magnification are determined, a lens must be designed such that the principal point positions of the lens are displaced to a considerable extent in order to maintain the image-formation relationship. In such cases, if a conventional refracting optical element is formed into a meniscus configuration with the principal point positions changed to a considerable extent, the curvature of the convex surface becomes strong, and the amount of aberration produced by the optical element increases. Consequently, the performance degrades to such a level that a practical optical system cannot be constructed. For this reason, in the case of a refracting optical element, the principal point positions cannot be changed to a considerable extent. In the case of a diffractive optical element, even if the power of the diffraction surface is increased, the amount of aberration does not become so large as in the refracting optical element. Therefore, if diffraction surfaces are provided on both sides of a diffractive optical element and given powers appropriately such that one of the surfaces has a positive power and the other has a negative power, the principal point positions can be changed to a larger extent than in the case of the conventional refracting optical element. Accordingly, a data imprinting optical system with a diffractive optical element according to the present invention is superior to the conventional optical systems in the freedom with which it can be disposed in a camera.

Thus, the employment of a diffractive optical element makes it possible to construct a space-saving data imprinting optical system and to increase the degree of freedom with which the data imprinting optical system can be disposed in a camera. Therefore, it is possible to reduce the size of the camera.

Examples 2, 3 and 4 relate to the second data imprinting optical system according to the present invention, which uses a diffractive optical element having a diffracting action by which the direction of an optical axis is changed.

EXAMPLE 2

Figure 2:
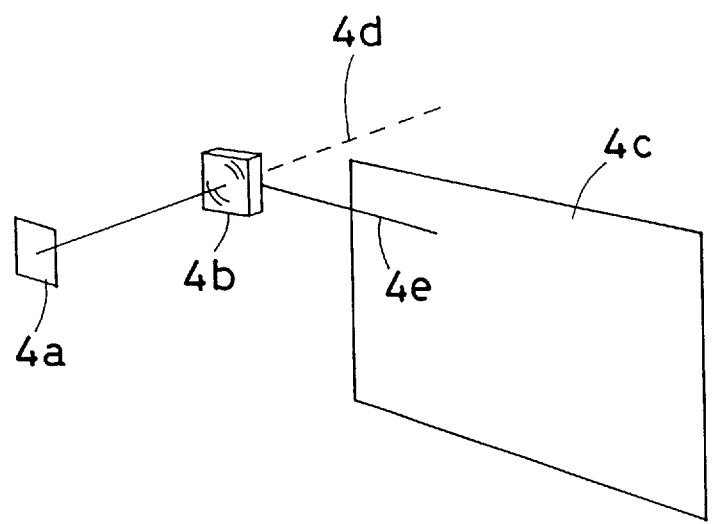
FIG. 2 is a conceptual view showing a data imprinting optical system according to Example 2 of the present invention.

FIG. 2 is a conceptual view showing a data imprinting optical system according to Example 2 of the present invention. In Example 2, data imprinting is performed by changing the image-formation position with a diffractive optical element that has both an image-forming action and a diffracting action by which the direction of an optical axis is changed. In the figure, reference character 4a denotes a display device that displays data; 4b denotes a diffractive optical element having both an optical axis direction changing action and an image-forming action; 4c denotes a film surface; 4d denotes an optical axis exiting from the display device 4a to enter the diffractive optical element 4b; and 4e denotes an optical path of light imprinted on the film surface 4c. Data displayed on the display device 4a is bent through the diffractive optical element 4b from the direction of the optical axis 4d to the direction of the optical axis 4e and then imaged on the film surface 4C.

Incidentally, various members and devices are provided in a camera. Therefore, to lay out a data imprinting optical system in such a manner as to avoid an interference with these components, it has heretofore been necessary for the data imprinting optical system to use many reflecting members to change the direction of the optical axis. However, if reflecting members are used to change the direction of the optical axis, the number of constituent members increases. Therefore, it is disadvantageous from the viewpoint of cost. To change the direction of an optical axis by a conventional refracting optical element, the conventional practice is to arrange refracting surfaces each having a curvature such that these refracting surfaces are largely decentered with respect to each other. With this method, however, the amount of aberration produced by the refracting surfaces increases, making it impossible to construct a data imprinting optical system exhibiting a sufficient performance. In contrast, a diffractive optical element enables the direction of the optical axis to be changed to effect image formation by appropriately arranging the diffraction grating pitch on the diffraction surface. Therefore, it is possible to construct a data imprinting optical system without an increase in the number of constituent members in comparison to the conventional data imprinting optical system. Even if the diffraction grating pitch is so set as to provide an optical axis direction changing action, the degradation of the performance is minimized because the diffraction surface produces a smaller amount of aberration than a refracting optical element. The use of a diffractive optical element having such an action makes it possible to increase the degree of design freedom to dispose the data imprinting optical system in a camera, and also enables the data imprinting optical system to be incorporated in the camera with a reduced cost. Thus, the data imprinting optical system according to this example can contribute to achievement of reductions in the size and cost of cameras, etc.

EXAMPLE 3

Figure 3:
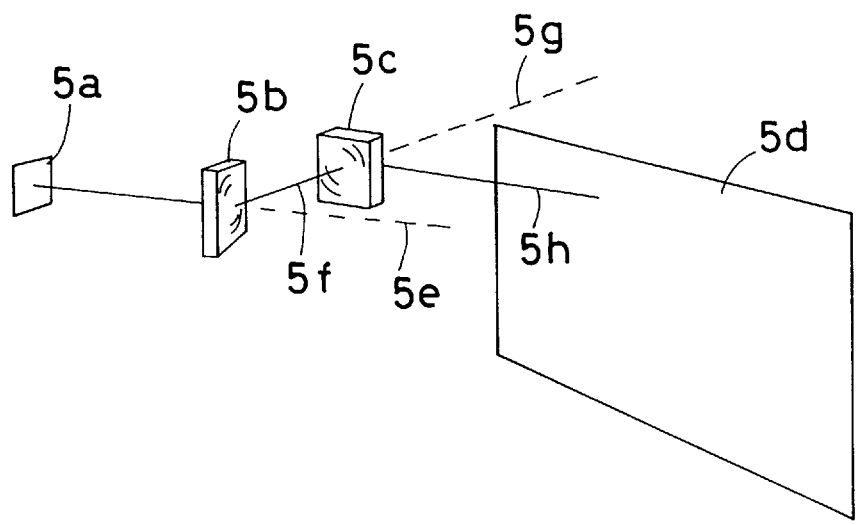
FIG. 3 is a conceptual view showing a data imprinting optical system according to Example 3 of the present invention.

FIG. 3 is a conceptual view showing a data imprinting optical system according to Example 3 of the present invention. Example 3 is an example of application of Example 2. In this example, a plurality of diffractive optical elements are used to change the direction of an optical axis a plurality of times, and thus the image-formation position is changed to effect imprinting of data. In the figure, reference character 5a denotes a display device that displays data; 5b and 5c denote diffractive optical elements each having both an optical axis direction changing action and a converging action; 5d denotes a film surface; 5e denotes an optical axis exiting from the display device 5a to enter the diffractive optical element 5b; 5f denotes an optical axis exiting from the diffractive optical element 5b; 5g denotes an optical axis exiting from the diffractive optical element 5b to enter the diffractive optical element 5c; 5h denotes an optical path of light emanating from the diffractive optical element 5c and imprinted on the film surface 5d. Data displayed on the display device 5a is bent through the diffractive optical element 5b from the direction of the optical axis 5e to the direction of the optical axis 5f and further bent through the diffractive optical element 5c from the direction of the optical axis 5g to the direction of the optical path 5h and then imaged on the film surface 5d.

The use of the diffractive optical elements 5b and 5c having the above-described actions makes it possible to utilize the space even more effectively than in Example 2. Therefore, it is possible to contribute to achievement of a reduction in the size of cameras, etc.

EXAMPLE 4

Figure 4:
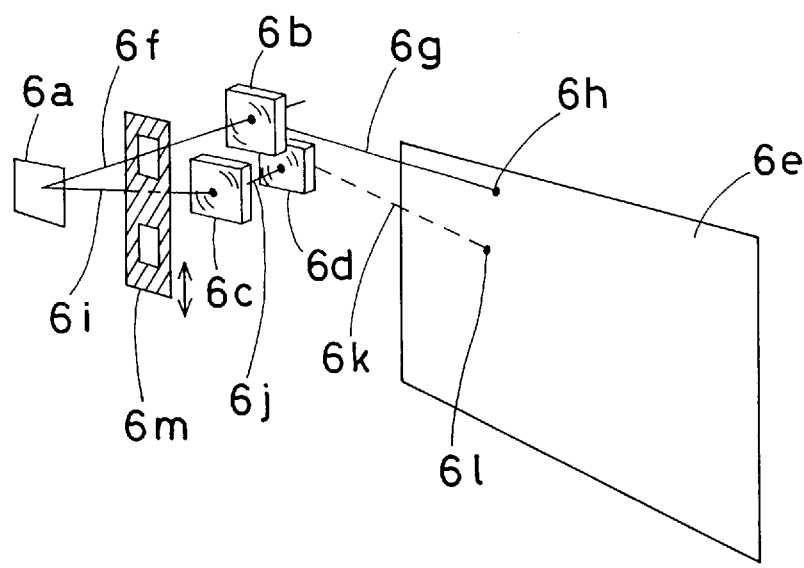
FIG. 4 is a conceptual view showing a data imprinting optical system according to Example 4 of the present invention.

FIG. 4 is a conceptual view showing a data imprinting optical system according to Example 4 of the present invention. Example 4 is an example of application of Example 2 and relates to a data imprinting optical system that enables two different data imprinting modes using a single display device. That is, diffractive optical elements that change the directions of optical axes are disposed on two optical axes to imprint data on different position. In the figure, reference character 6a denotes a display device that displays data. An optical path that extends from the display device 6a and passes through optical paths 6f and 6g to reach a position 6h is defined as a first optical path. An optical path that extends from the display device 6a and passes through optical paths 6i, 6j and 6k to reach a position 6l is defined as a second optical path.

In the first optical path, reference character 6b denotes a diffractive optical element having both an optical axis direction changing action and an image-forming action; 6e denotes a film surface; 6f denotes an optical axis entering the diffractive optical element 6b; 6g denotes an optical axis exiting from the diffractive optical element 6b; 6h denotes a position at which data is imprinted on the film surface 6e; and 6m denotes an optical path selecting member. Data displayed on the display device 6a passes through the optical path 6f and passes through the diffractive optical element 6b by which the direction of the optical axis is bent. Thereafter, the data passes through the optical path 6g and is then imaged at the position 6h on the film surface 6e.

In the second optical path, reference characters 6c and 6d denote diffractive optical elements each having both an optical axis direction changing action and an image-forming action; 6e denotes a film surface; 6i denotes an optical axis entering the diffractive optical element 6c; 6j denotes an optical axis exiting from the diffractive optical element 6c to enter the diffractive optical element 6d; 6k denotes an optical axis exiting from the diffractive optical element 6d; 6l denotes a position at which data is imprinted on the film surface 6e; and 6m denotes an optical path selecting member. Data displayed on the display device 6a passes through the optical path 6i and further passes through the diffractive optical element 6c by which the direction of the optical axis is bent. Thereafter, the data passes through the optical path 6j and further passes through the diffractive optical element 6d by which the direction of the optical axis is bent. Thereafter, the data passes through the optical path 6k and is then imaged at the position 6l on the film surface 6e.

The first optical path and the second optical path can be switched from one to the other by the optical path selecting member 6m. Thus, an imprint position and a magnification can be selected.

By the use of diffractive optical elements having the above-described actions, a data imprinting optical system that enables a plurality of different data imprinting modes can be disposed in the limited space. Therefore, it is possible to contribute to achievement of a reduction in the size of cameras, etc.

Examples 5, 6, 7, 8 and 9 relate to the third data imprinting optical system according to the present invention, which uses a diffractive optical element having a reflecting surface.

EXAMPLE 5

Figure 5:
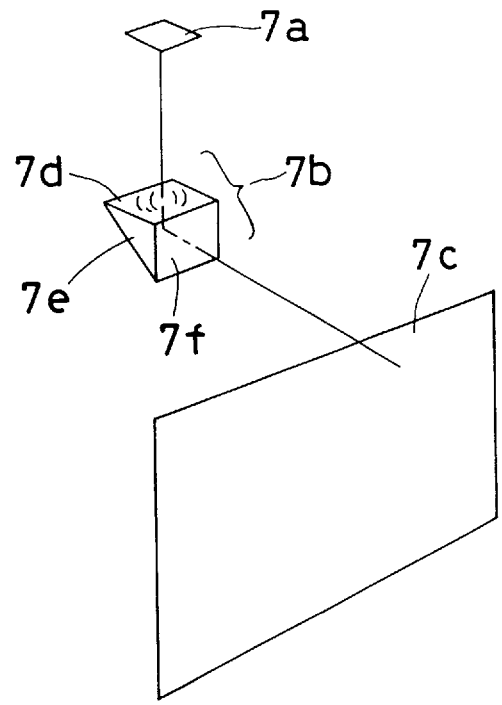
FIG. 5 is a conceptual view showing a data imprinting optical system according to Example 5 of the present invention.

FIG. 5 is a conceptual view showing a data imprinting optical system according to Example 5 of the present invention. In Example 5, a prism with a diffraction surface having an image-forming action is used to change the direction of an optical axis to a considerable extent to effect imprinting of data. In the figure, reference numeral 7a denotes a display device that displays data; 7b denotes a diffractive optical element; and 7c denotes a film surface. The diffractive optical element 7b has an entrance surface 7d which has a diffraction surface having an image-forming action. The diffractive optical element 7b further has a reflecting surface 7e that changes the direction of an optical axis, and an exit surface 7f. Data displayed on the display device 7a passes through the entrance surface 7d and is then reflected once by the reflecting surface 7e. Thereafter, the data passes through the exit surface 7f and is then imaged on the film surface 7c.

Since various members and devices are provided in a camera, a data imprinting optical system must be laid out so as to avoid an interference with these components. Therefore, it has heretofore been necessary to change the direction of the optical axis of the data imprinting optical system. Accordingly, Example 2 uses a diffractive optical element that changes the direction of an optical axis. Incidentally, to change the direction of an optical axis to a considerable extent, the diffraction grating pitch on the diffraction surface must be set to a very small value. If the pitch is excessively small, the diffraction grating cannot be formed; therefore, the desired diffractive optical element cannot be obtained. For this reason, a diffractive optical element has heretofore been unsuitable for bending an optical axis at a large angle.

Meanwhile, there has been a conventional technique wherein a reflecting member having a refracting surface is used to change the direction of an optical axis and to effect image formation. The use of a reflecting surface enables an optical axis to be bent at a large angle. However, in a case where a refracting surface is a convex surface, the peripheral portion of the surface has a shorter vitreous path length than that on the optical axis because of the curvature. Therefore, it is necessary to increase the vitreous path length on the optical axis so that the refracting surface will not interfere with the reflecting surface or another optical surface. Consequently, the reflecting member becomes undesirably large.

In the case of a diffraction surface, a lens action can be imparted thereto by appropriately arranging the diffraction grating pitch. Therefore, it is possible to form a diffractive optical element having a lens action using flat surfaces on both sides thereof, as in the case of the diffractive optical element 7b, without a need of giving a curvature to neither of the surfaces, and hence possible to shorten the vitreous path length. Accordingly, the size of the constituent member can be reduced, and the optical axis can be bent at a large angle.

By using such a diffractive optical element, the data imprinting optical system provides an increased degree of design freedom to dispose it in a camera, and at the same time, the size of the constituent member can be reduced. Therefore, it is possible to contribute to achievement of a reduction in the size of cameras, etc.

EXAMPLE 6

Figure 6:
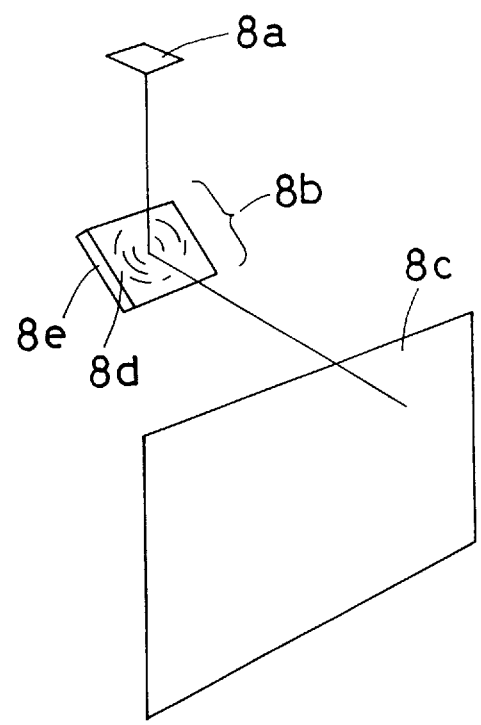
FIG. 6 is a conceptual view showing a data imprinting optical system according to Example 6 of the present invention.

FIG. 6 is a conceptual view showing a data imprinting optical system according to Example 6 of the present invention. In Example 6, a surface-coated reflecting member having on a reflecting surface a diffraction surface having an image-forming action is used to change the direction of an optical axis to a considerable extent to effect imprinting of data. In the figure, reference character 8a denotes a display device that displays data; 8b denotes a diffractive optical element; and 8c denotes a film surface. The diffractive optical element 8b has a reflecting surface 8d having an image-forming action, and a back surface 8e at the back of the reflecting surface 8d. Data displayed on the display device 8a is reflected once by the reflecting surface 8d and imaged on the film surface 8c.

As has already been stated, to lay out a data imprinting optical system in such a manner as to avoid an interference with a member or device provided in a camera, it is necessary to change the direction of an optical axis of the data imprinting optical system. The arrangement of Example 5 enables the constituent member to reduce in size in comparison to the conventional refracting optical element, and allows the optical axis to be bent at a large angle. However, because the constituent member is formed from a prism, it is necessary to further reduce the size of the member. On the other hand, if a reflecting surface is given a curvature to provide both an image-forming action and an optical axis direction changing action, a useless space occurs in a camera when the data imprinting optical system is disposed therein because of the curvature. Thus, the volumetric capacity occupied by the data imprinting optical system in the camera is not always small.

However, if a diffraction surface is used as a reflecting surface, a lens action can be provided by appropriately arranging the diffraction grating pitch. Therefore, a diffractive optical element having a lens action can be formed using flat surfaces on both sides thereof, as in the case of the diffractive optical element 8b, without a need of giving a curvature to neither of the surfaces. Accordingly, the diffractive optical element is smaller in size than the prism and can be disposed with considerable savings in space in comparison to a case where a curvature is given to a reflecting surface.

By using such a diffractive optical element, the data imprinting optical system can be constructed in a compact structure in comparison to the conventional system. Therefore, the data imprinting optical system can be disposed in a vacant space in a camera. This contributes to achievement of a reduction in the size of cameras, etc.

EXAMPLE 7

Figure 7A:
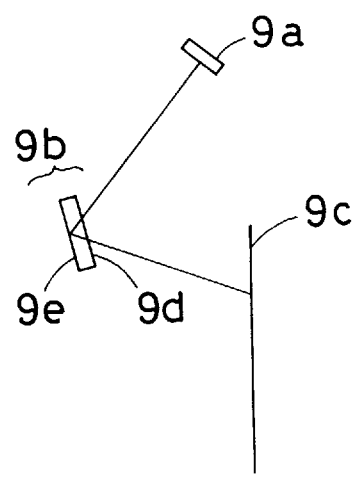
FIGS. 7(*a*), 7(*b*) and 7(*c*) are conceptual views showing data imprinting optical systems according to Examples 7 to 9 of the present invention.

FIG. 7(a) is a conceptual view showing a data imprinting optical system according to Example 7 of the present invention. Example 7 is an example of application of Example 6. In this example, a back-coated reflecting member having on a reflecting surface a diffraction surface having an image-forming action is used to change the direction of an optical axis to a considerable extent to effect imprinting of data. In the figure, reference character 9a denotes a display device that displays data; 9b denotes a diffractive optical element; and 9c denotes a film surface.

The diffractive optical element 9b has a reflecting surface 9e having a diffraction action, and a surface 9d on the top thereof. Data displayed on the display device 9a passes through the surface 9d and is reflected once by the reflecting surface 9e. After repassing the surface 9d, the data is imaged on the film surface 9c.

The use of the above-described diffractive optical element makes it possible to obtain the same advantageous effects as those in Example 6. In particular, the back surface of the back-coated reflecting member can be protected from dust when the reflecting member is retained. Therefore, this example is advantageous in that the image-forming action is unlikely to be degraded by contamination.

EXAMPLE 8

Figure 7B:
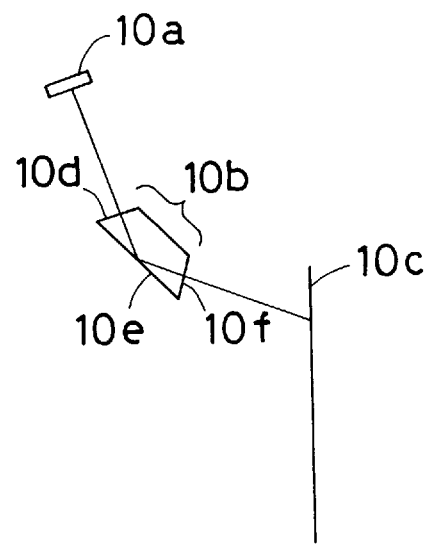

FIG. 7(b) is a conceptual view showing a data imprinting optical system according to Example 8 of the present invention. Example 8 is an example of application of Example 6. In this example, a prism having on a reflecting surface a diffraction surface having an image-forming action is used to change the direction of an optical axis to a considerable extent to effect imprinting of data. In the figure, reference character 10a denotes a display device that displays data; 10b denotes a diffractive optical element; and 10c denotes a film surface. The diffractive optical element 10b has an entrance surface 10d; a reflecting surface 10e having an image-forming action by diffraction; and an exit surface 10f. Data displayed on the display device 10a passes through the entrance surface 10d and is reflected once by the reflecting surface 10e. After passing through the exit surface 10f, the data is imaged on the film surface 10c.

Thus, if an optical action is given to the entrance surface 10d or the exit surface 10f by using the above-described diffractive optical element, it is possible to achieve further savings in space and a higher performance. For example, if the entrance surface 10d or the exit surface 10f is formed from a diffraction surface having an optical axis direction changing action, the degree of freedom of camera layout further increases.

EXAMPLE 9

Figure 7C:
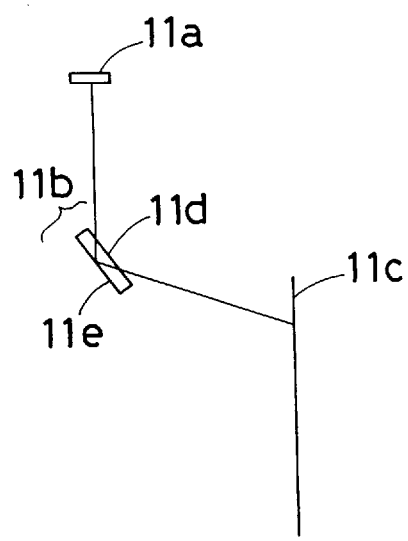

FIG. 7(c) is a conceptual view showing a data imprinting optical system according to Example 9 of the present invention. Example 9 is an example of application of Example 6. Example 9 uses a member that has a diffraction surface having an image-forming action on its obverse side and a reflecting surface on its reverse side to change the direction of an optical axis to a considerable extent to effect imprinting of data. In the figure, reference numeral 11a denotes a display device that displays data; 11b denotes a diffractive optical element; and 11c denotes a film surface. The diffractive optical element 11b has a reflecting surface 11e formed by evaporation of a metallic substance, e.g. aluminum, and a diffraction surface 11d. Data displayed on the display device 11a passes through the diffraction surface 11d and is reflected once by the reflecting surface 11e. After repassing through the diffraction surface 11d, the data is imaged on the film surface 11c.

In a case where a metallic substance is evaporated on a reflecting surface having a diffraction surface as in Examples 6 and 7, the deposited substance may vary in thickness, causing the depth of grooves in the diffraction surface to become nonuniform, which results in a degradation of the performance. Therefore, a diffraction surface having an image-forming action is provided on the obverse side, while a reflecting surface is provided on the reverse side, and vapor deposition is carried out on the reverse surface. Accordingly, it is possible to eliminate the effect of vapor deposition on the image formation and hence possible to solve the problem in terms of the performance.

The use of the above-described diffractive optical element makes it possible to obtain the same advantageous effects as those in Example 6. Moreover, because the diffraction surface is not disordered by vapor deposition, degradation of the performance is unlikely to occur.

In a case where a reflecting surface has a diffraction surface as in Examples 6, 7 and 8, the angle of reflection is preferably an acute angle. In the case of an acute reflection angle, aberration correction can be made easily, and thus the performance improves.

Examples 10, 11, 12, 13, 14, 15 and 16 relate to the fourth data imprinting optical system according to the present invention, which uses a diffractive optical element having a plurality of image-formation points.

EXAMPLE 10

Figure 8:
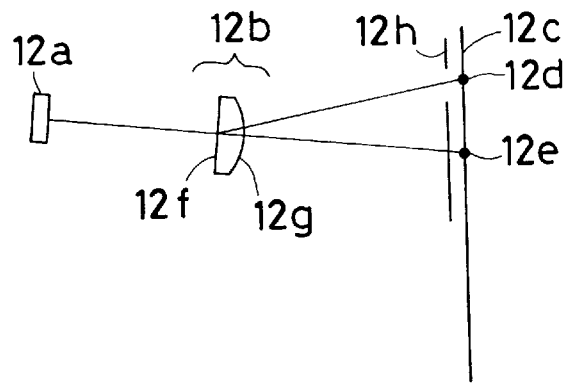
FIG. 8 is a conceptual view showing a data imprinting optical system according to Example 10 of the present invention.

FIG. 8 is a conceptual view showing a data imprinting optical system according to Example 10 of the present invention. Example 10 uses a diffractive optical element having a diffraction surface that separates incident light into a plurality of orders of light, thereby enabling a plurality of different data imprinting modes. Data to be imprinted is selected by selecting an optical path. In the figure, reference character 12a denotes a display device that displays data; 12b denotes a diffractive optical element; 12c denotes a film surface; 12d denotes a first image-formation point; 12e denotes a second image-formation point; and 12h denotes an optical path selecting member. The diffractive optical element 12b has a diffraction surface 12f and a refracting surface 12g. The diffraction surface 12f has a diffraction grating arranged in an approximately straight-line form. The diffraction surface 12f is adapted to separate incident light into a plurality of orders of light. Data displayed on the display device 12a is separated into zero-order light and first-order light by the diffraction surface 12f. The first-order light is imaged at the first image-formation point 12d by the refracting surface 12g. The zero-order light is imaged at the second image-formation point 12e by the refracting surface 12g.

The data imprinting optical system according to this example is adapted to image data at two image-formation points 12d and 12e on the film surface 12c. Therefore, the data imprinting optical system is tilted with respect to the film surface 12c. Data to be imprinted can be selected by selecting one of the two optical paths through the optical path selecting member 12h. Data imprinting is carried out as follows: After the completion of photo shooting, data displayed on the display device 12a is sequentially changed in synchronism with the film winding-up operation, thereby imprinting data selected through the optical path selecting member 12h.

These days, there are cases where data is imprinted in each of two photography modes, i.e. ordinary photography and panoramic photography. Conventionally, a plurality of refracting optical elements are used to enable a plurality of different data imprinting modes. For this reason, the number of constituent members increases. The conventional arrangement is also disadvantageous from the viewpoint of space in the camera. Meanwhile, if a refracting optical element is moved, a plurality of different imprinting modes can be realized with a single refracting optical element. However, a mechanism for moving the refracting optical element is additionally needed. Accordingly, this method is unfavorable. In contrast, a diffractive optical element enables the intensity of a certain order of light to be increased by appropriately setting the groove depth on the diffraction surface. Therefore, if the groove depth is controlled such that a plurality of orders of light are generated and each order of light is imaged, a plurality of different imprinting modes can be realized with a single member. Thus, it is possible to reduce the number of constituent members in comparison to the conventional data imprinting optical system.

The use of such a diffractive optical element makes it possible to construct a low-cost and space-saving data imprinting optical system that enables a plurality of different data imprinting modes. Accordingly, it is possible to contribute to achievement of reductions in the cost and size of cameras.

EXAMPLE 11

Figure 9:
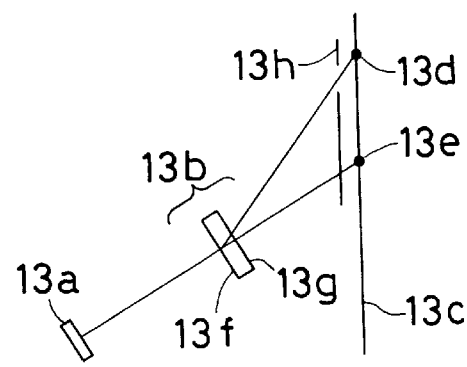
FIG. 9 is a conceptual view showing a data imprinting optical system according to Example 11 of the present invention.

FIG. 9 is a conceptual view showing a data imprinting optical system according to Example 11 of the present invention. Example 11 is an example of application of Example 10. Example 11 uses a diffractive optical element having a diffraction surface that separates incident light into a plurality of orders of light and another diffraction surface having an image-forming action, thereby enabling a plurality of different data imprinting modes. Data to be imprinted is selected by selecting an optical path. In the figure, reference character 13a denotes a display device that displays data; 13b denotes a diffractive optical element; 13c denotes a film surface; 13d denotes a first image-formation point; 13e denotes a second image-formation point; and 13h denotes an optical path selecting member. The diffractive optical element 13b has diffraction surfaces 13f and 13g. The diffraction surface 13f is formed from an approximately straight-line-shaped diffraction grating and adapted to separate incident light into a plurality of orders of light. The diffraction surface 13g is formed from an approximately concentric diffraction grating and adapted to perform an image-forming action. Data displayed on the display device 13a is separated into zero-order light and first-order light by the diffraction surface 13f. The zero-order light is imaged at the point 13d by second-order light generated by the diffraction surface 13g. The first-order light is imaged at the point 13e by first-order light generated by the diffraction surface 13g.

The data imprinting optical system according to this example is adapted to image data at two image-formation points 13d and 13e on the film surface 13c. Therefore, the data imprinting optical system is tilted with respect to the film surface 13c. Data to be imprinted can be selected by selecting one of the two optical paths through the optical path selecting member 13h. Data imprinting is carried out as follows: After the completion of photo shooting, data displayed on the display device 13a is sequentially changed in synchronism with the film winding-up operation, thereby imprinting data selected through the optical path selecting member 13h.

By using the above-described diffractive optical element, advantageous effects similar to those in Example 10 are obtained, and the lens becomes thinner than in Example 10. Moreover, because the image-formation magnification can be varied at the image-formation points 13d and 13e, data can be imprinted with a proper size for a photograph having a different enlarging magnification such as a panoramic photograph.

EXAMPLE 12

Figure 10A:
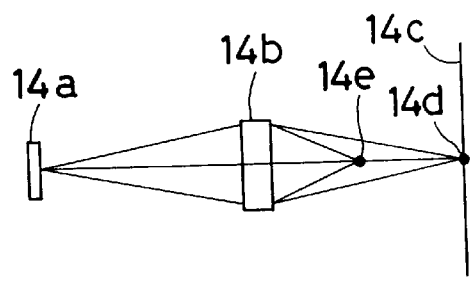
FIGS. 10(*a*) and 10(*b*) are conceptual views showing a data imprinting optical system according to Example 12 of the present invention.
Figure 10B:
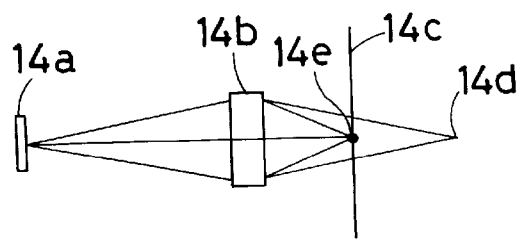

FIGS. 10(a) and 10(b) are conceptual views showing a data imprinting optical system according to Example 12 of the present invention. FIGS. 10(a) and 10(b) respectively show the data imprinting optical system in two imprinting positions switched over from one to the other. Example 12 is an example of application of Example 10. In this example, a diffractive optical element having a plurality of image-formation points different in order of diffraction is used to enable a plurality of different data imprinting modes. Data to be imprinted is selected by selecting a desired optical path by moving both the display device and the diffractive optical element in the direction of the optical axis. In the figures, reference character 14a denotes a display device that displays data; 14b denotes a diffractive optical element having an image-forming action and further having a plurality of image-formation points different in order of diffraction; 14c denotes a film surface; 14d denotes a first image-formation point; and 14e denotes a second image-formation point. Data displayed on the display device 14a is passed through the diffractive optical element 14b. Thus, the data is imaged at the image-formation point 14d by first-order light and also imaged at the image-formation point 14e by second-order light.

In the position shown in FIG. 10(a), the data imprinting optical system is disposed such that the first image-formation point 14d of the two points lies on the film surface 14c. To imprint the data at the second image-formation point 14e, the display device 14a and the diffractive optical element 14b are moved in the optical axis direction relative to the film surface 14c, as shown in FIG. 10(b), thereby placing the second image-formation point 14e on the film surface 14c.

The use of the above-described diffractive optical element makes it possible to obtain advantageous effects similar to those in Example 10. It should be noted that the indication position can be changed by moving the whole data imprinting optical system in a direction perpendicular to the optical axis.

EXAMPLE 13

Figure 11A:
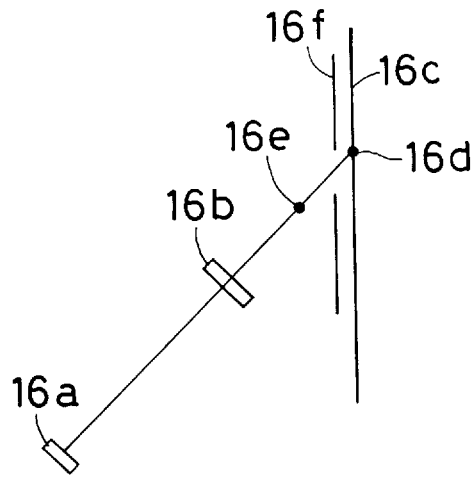
FIGS. 11(*a*) and 11(*b*) are conceptual views showing a data imprinting optical system according to Example 13 of the present invention.
Figure 11B:
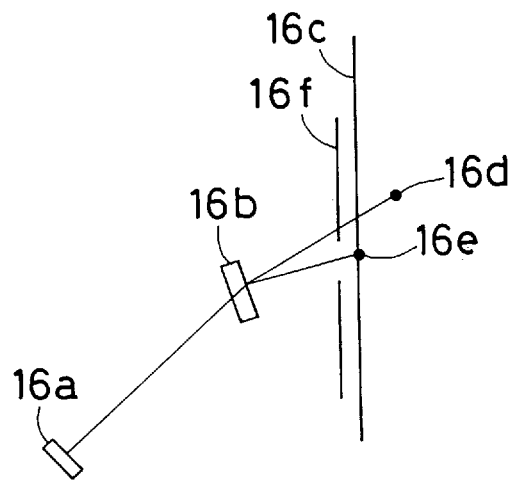

FIGS. 11(a) and 11(b) are conceptual views showing a data imprinting optical system according to Example 13 of the present invention. FIGS. 11(a) and 11(b) respectively show the data imprinting optical system in two imprinting positions switched over from one to the other. Example 13 is an example of application of Example 10. In this example, a diffractive optical element having a plurality of image-formation points different in order of diffraction is used to enable a plurality of different data imprinting modes. Data to be imprinted is selected by selecting a desired optical path by rotating the diffractive optical element around an axis perpendicular to the optical axis and parallel to the surface to be imprinted with data. In the figure, reference character 16a denotes a display device that displays data; 16b denotes a diffractive optical element having an image-forming action and further having a plurality of image-formation points different in order of diffraction; 16c denotes a film surface; 16d denotes a first image-formation point; 16e denotes a second image-formation point; and 16f denotes an optical path selecting member. Data displayed on the display device 16a is passed through the diffractive optical element 16b. Thus, the data is imaged at the image-formation point 16d by first-order light and also imaged at the image-formation point 16e by second-order light.

In the position shown in FIG. 11(a), the data imprinting optical system is disposed such that the first image-formation point 16d of the two points lies on the film surface 16c. To select the other image-formation point 16e in this position, the image-formation point 16e is made coincident with the film surface 16c by making use of the fact that as the lens (diffractive optical element 16b) is tilted, the position of the image-formation point changes. That is, the optical paths are switched over from one to the other by the optical path selecting member 16f as shown in FIG. 11(b) and, moreover, the diffractive optical element 16b is rotated around an axis perpendicular to the optical axis and parallel to the film surface 16c, thereby placing the image-formation point 16e on the film surface 16c.

Thus, the data imprinting optical system according to this example is tilted with respect to the film surface 16c in order to place the two image-formation points 16d and 16e on the film surface 16c. Data imprinting is carried out as follows: After the completion of photo shooting, data displayed on the display device 16a is sequentially changed in synchronism with the film winding-up operation, thereby imprinting data selected through the optical path selecting member 16f.

The use of the above-described diffractive optical element makes it possible to obtain advantageous effects similar to those in Example 10.

EXAMPLE 14

Figure 12:
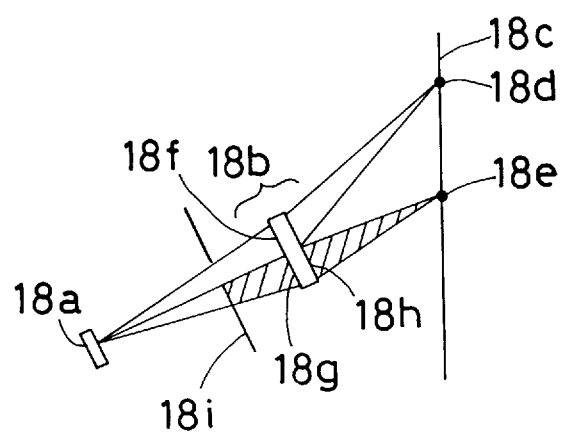
FIG. 12 is a conceptual view showing a data imprinting optical system according to Example 14 of the present invention.
Figure 14:
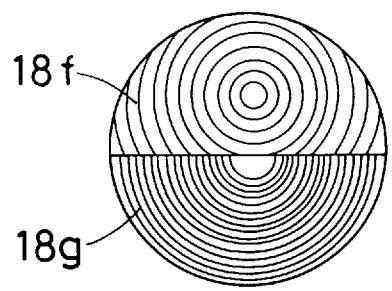
FIGS. 14(*a*) and 14(*b*) are plan views respectively showing diffraction surfaces of diffractive optical elements in Example 14 and the modification thereof.
Figure 14:
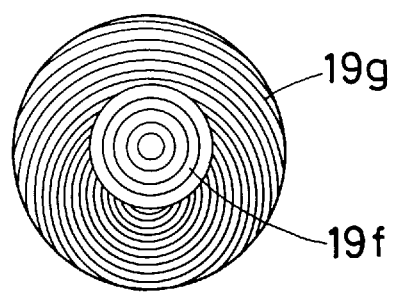

FIG. 12 is a conceptual view showing a data imprinting optical system according to Example 14 of the present invention. In Example 14, a diffractive optical element having diffraction surfaces of different grating periods is used to enable a plurality of different data imprinting modes, and data to be imprinted is selected by selecting an optical path. In the figure, reference character 18a denotes a display device that displays data; 18b denotes a diffractive optical element; 18c denotes a film surface; 18d denotes a first image-formation point; 18e denotes a second image-formation point; and 18i denotes an optical path selecting member. The diffractive optical element 18b has a pair of diffraction surfaces 18f and 18g of different grating periods and a plane surface 18h on the opposite side. As shown in the plan view of FIG. 14(a), the diffraction surfaces 18f and 18g are formed from approximately concentric diffraction gratings, respectively, which are provided in two areas divided by a straight line. The diffraction surfaces 18f and 18g are made different in both grating pitch and center of rings and therefore different in both focal length and optical axis direction from each other. Data displayed on the display device 18a is passed through the diffractive optical element 18b. A part of the data is imaged at the image-formation point 18d by the diffraction surface 18f after passing through the plane surface 18h. The other part of the data is imaged at the image-formation point 18e by the diffraction surface 18g after passing through the plane surface 18h.

The data imprinting optical system according to this example is tilted with respect to the film surface 18c in order to place the two image-formation points 18d and 18e on the film surface 18c. Data to be imprinted can be selected by selecting one of the two optical paths with the optical path selecting member 18i.

These days, it is necessary to imprint data in each of two photography modes, i.e. ordinary photography and panoramic photography, as has been stated in connection with Example 10. Accordingly, Example 10 uses a diffractive optical element having a plurality of image-formation points different in order of diffraction. However, the focal length and the light separating direction depend on the order of diffraction. Therefore, the degree of freedom to set a magnification and an imprint position is unfavorably low. In the case of a conventional refracting optical element, one approach to allow a single optical member to have a plurality of image-formation points is to form a plurality of surfaces having different curvatures on one surface. However, this method is unfavorable because it causes the arrangement to become complicated.

In contrast, a diffractive optical element enables the focal length and the optical axis direction to be changed simply by forming a plurality of areas from diffraction surfaces varied in the grating period. Therefore, a diffractive optical element can be formed from a simple member having flat surfaces on both sides thereof as in the case of the diffractive optical element 18b. Accordingly, the magnification and the direction of the optical axis can be changed with a simpler arrangement than in the case of the conventional optical system.

By using the above-described diffractive optical element in a data imprinting optical system that enables a plurality of different data imprinting modes, it is possible to increase the degree of freedom to set an imprinting magnification and an imprint position. Accordingly, the degree of design freedom to dispose the data imprinting optical system in a camera increases. Thus, it is possible to contribute to achievement of a reduction in the size of the camera.

Figure 13:
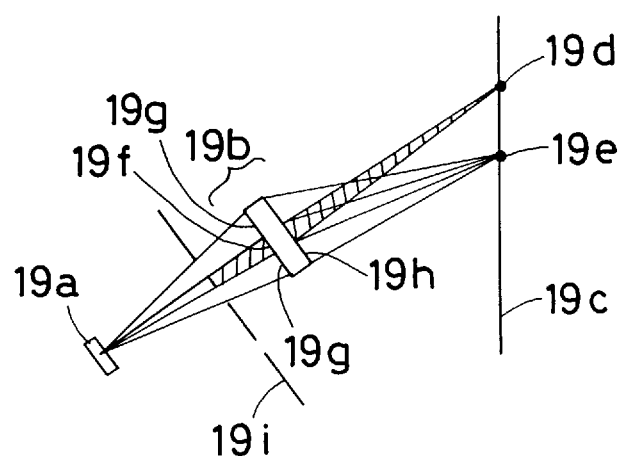
FIG. 13 is a conceptual view showing a data imprinting optical system according to a modification of Example 14.

FIG. 13 shows a modification that is different in arrangement of diffraction surfaces from the example shown in FIG. 12. More specifically, the modification shown in FIG. 13 differs from the example shown in FIG. 12 in arrangement of areas varied in grating period. In FIG. 13, reference character 19a denotes a display device that displays data; 19b denotes a diffractive optical element; 19c denotes a film surface; 19d denotes a first image-formation point; 19e denotes a second image-formation point; and 19i denotes an optical path selecting member. The diffractive optical element 19b has a pair of diffraction surfaces 19f and 19g of different grating periods and a plane surface 19h on the opposite side. As shown in the plan view of FIG. 14(b), the diffraction surfaces 19f and 19g are formed from approximately concentric diffraction gratings, respectively, which are provided in two areas divided by a circle. The diffraction surfaces 19f and 19g are made different in both grating pitch and center of rings and therefore different in both focal length and optical axis direction from each other. This arrangement also makes it possible to obtain the same advantageous effects as those obtained by the arrangement shown in FIG. 12.

EXAMPLE 15

Figure 15A:
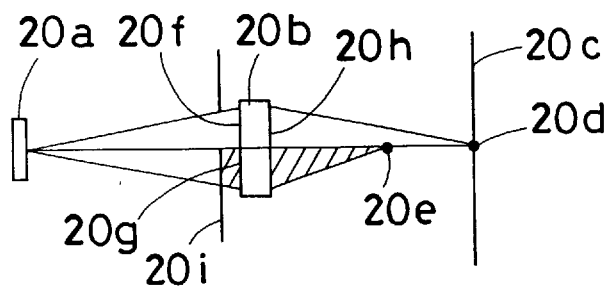
FIGS. 15(*a*) and 15(*b*) are conceptual views showing a data imprinting optical system according to Example 15 of the present invention.
Figure 15B:
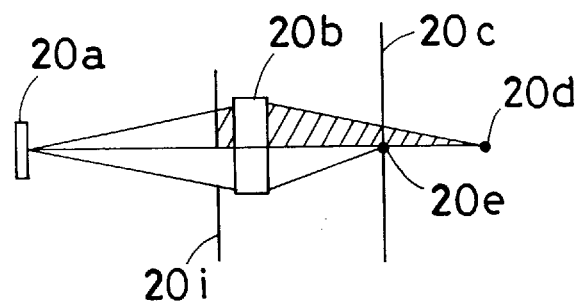

FIGS. 15(a) and 15(b) are conceptual views showing a data imprinting optical system according to Example 15 of the present invention. FIGS. 15(a) and 15(b) respectively show the data imprinting optical system in two imprinting positions switched over from one to the other. Example 15 is an example of application of Example 14. In this example, a diffractive optical element having diffraction surfaces of different grating periods is used to enable a plurality of different data imprinting modes, and data to be imprinted is selected by selecting a desired optical path by moving both the display device and the diffractive optical element such that the corresponding image-formation point coincides with the film surface. In the figure, reference character 20a denotes a display device that displays data; 20b denotes a diffractive optical element; 20c denotes a film surface; 20d denotes a first image-formation point; 20e denotes a second image-formation point; and 20i denotes an optical path selecting member. The diffractive optical element 20b has a pair of diffraction surfaces 20f and 20g of different grating periods and a plane surface 20h on the opposite side. The diffraction surfaces 20f and 20g are formed from approximately concentric diffraction gratings, respectively, which are provided in two areas divided by a straight line. The diffraction surfaces 20f and 20g are made different in grating pitch to make their focal lengths different from each other. Data displayed on the display device 20a is passed through the diffractive optical element 20b. A part of the data is imaged at the image-formation point 20d by the diffraction surface 20f after passing through the plane surface 20h. The other part of the data is imaged at the image-formation point 20e by the diffraction surface 20g after passing through the plane surface 20h.

In the position shown in FIG. 15(a), the data imprinting optical system is disposed such that the first image-formation point 20d of the two points lies on the film surface 20c. To imprint the data at the second image-formation point 20e, as shown in FIG. 15(b), the desired optical path is selected by the optical path selecting member 20i, and moreover, the display device 20a and the diffractive optical element 20b are moved in the optical axis direction relative to the film surface 20c, thereby placing the second image-formation point 20e on the film surface 20c.

The use of the above-described diffractive optical element makes it possible to obtain advantageous effects similar to those in Example 14. It should be noted that the indication position can be changed by moving the whole data imprinting optical system in a direction perpendicular to the optical axis.

EXAMPLE 16

Figure 16:
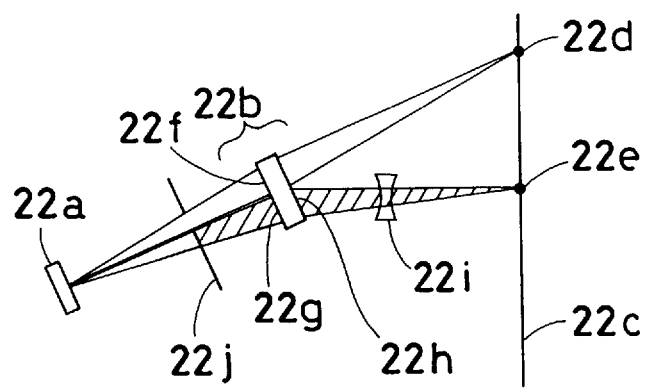
FIG. 16 is a conceptual view showing a data imprinting optical system according to Example 16 of the present invention.

FIG. 16 is a conceptual view showing a data imprinting optical system according to Example 16 of the present invention. Example 16 is an example of application of Example 14. In this example, a diffractive optical element having diffraction surfaces of different grating periods is used to enable a plurality of different data imprinting modes, and an optical member is additionally disposed on one optical axis. Further, data to be imprinted is selected by selecting an optical path. In the figure, reference character 22a denotes a display device that displays data; 22b denotes a diffractive optical element; 22c denotes a film surface; 22d denotes a first image-formation point; 22e denotes a second image-formation point; 22i denotes a refracting optical element; and 22j denotes an optical path selecting member. The diffractive optical element 22b has a pair of diffraction surfaces 22f and 22g of different grating periods and a plane surface 22h on the opposite side. The diffraction surfaces 22f and 22g are formed from approximately concentric diffraction gratings, respectively, which are provided in two areas divided by a straight line. The diffraction surfaces 22f and 22g are made different in both grating pitch and center of rings and therefore different in both focal length and optical axis direction from each other. Data displayed on the display device 22a is passed through the diffractive optical element 22b. A part of the data is imaged at the image-formation point 22d by the diffraction surface 22f after passing through the plane surface 22h. The other part of the data is imaged at the image-formation point 22e by the diffraction surface 22g after passing through the plane surface 22h and further passing through the refracting optical element 22i. Data to be imprinted can be selected by selecting one of the two optical paths through the optical path selecting member 22j.

By using the above-described diffractive optical element and refracting optical element, the focus position can be adjusted. Therefore, the degree of design freedom to dispose the data imprinting optical system in a camera increases, and it is possible to contribute to achievement of a reduction in the size of the camera.

In the above-described Examples 11 to 16, the data imprinting optical systems may be arranged such that data items imprinted on a panoramic photograph and an ordinary photograph, respectively, which are different in enlarging magnification, have the same size after printing.

To change the imprint position on the film surface, the image-formation position may be changed by moving only the display device in a direction perpendicular to the optical axis relative to the optical system.

The following Examples 17, 18 and 19 relate to the fifth data imprinting optical system according to the present invention, which uses a diffractive optical element that is integral with another optical member.

EXAMPLE 17

Figure 17:
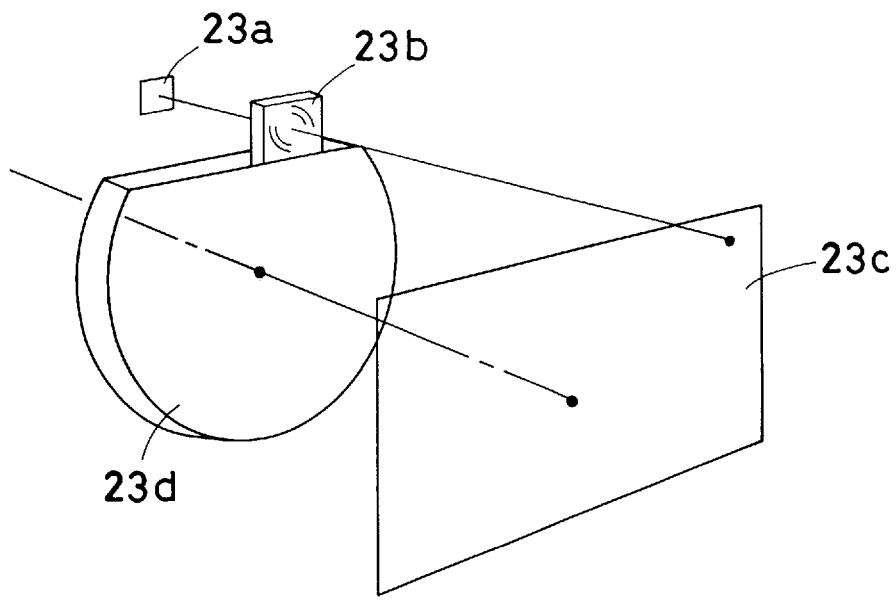
FIG. 17 is a conceptual view showing a data imprinting optical system according to Example 17 of the present invention.

FIG. 17 is a conceptual view showing a data imprinting optical system according to Example 17 of the present invention. In Example 17, imprinting of data is effected by a diffractive optical element provided on a taking lens outside the optical surface thereof. In the figure, reference numeral 23a denotes a display device that displays data; 23b denotes a diffractive optical element having both an image-forming action and an optical axis direction changing action; 23c denotes a film surface; and 23d denotes a part of a photographic optical system that forms an image of a subject on the film surface 23c. The diffractive optical element 23b and the part 23d of the photographic optical system are integrally molded of a plastic material. The diffractive optical element 23b is provided outside the optical surface of the part 23d of the photographic optical system. Data displayed on the display device 23a is imaged on the film surface 23c through the diffractive optical element 23b.

Hitherto, the number of constituent members has been reduced to lower the cost. However, the number of constituent members cannot be reduced unlimitedly to fulfill the necessary function. Another method of reducing the cost is to integrate a data imprinting optical system with another optical member. Let us consider, first, a case where a data imprinting optical system using a refracting optical element is formed integral with a part of a photographic optical system. There has heretofore been a case where the refracting optical element must be formed into a meniscus configuration with the principal point positions changed in order to maintain the image-formation relationship. By doing so, however, the curvature of the convex surface becomes undesirably strong, and the amount of aberration produced therefrom increases. Accordingly, the performance is degraded, and a satisfactory optical system cannot be constructed. Moreover, it is necessary to change the direction of the optical axis in order to attain a correct imprint position. However, if a reflecting member is used to bend the optical axis, the number of constituent members increases. This is disadvantageous from the viewpoint of cost and space. There has been another method wherein surfaces each having a curvature are largely decentered with respect to each other. With this method, however, the performance is not satisfactory, and the desired optical system cannot be constructed. Thus, it has heretofore been difficult to integrate an optical member of a data imprinting optical system with a part of a photographic optical system.

In the case of a diffractive optical element, even if the power of the diffraction surface is increased, the amount of aberration does not become so large as in the refracting optical element. Therefore, if diffraction surfaces are provided on both sides of a diffractive optical element, the principal point positions can be changed to a large extent. Moreover, if the diffraction grating pitch is appropriately arranged, the direction of the optical axis can be changed. Therefore, the use of a diffractive optical element enables the data imprinting optical system to be integrated with a part of a photographic optical system relatively easily because the degree of freedom to design the data imprinting optical system is higher than in the case of the conventional technique.

The use of such a diffractive optical element contributes to achievement of a reduction in the cost of cameras, etc. because the constituent members can be favorably integrated together. There are cases where the effective portion of the part 23d of the photographic optical system is rectangular because the image size of the photographic optical system is rectangular. Therefore, if a part of the lens that is outside the effective area is cut off and the diffractive optical element 23b is disposed in the resulting space as in this example, it is possible to achieve further savings in space.

EXAMPLE 18

Figure 18:
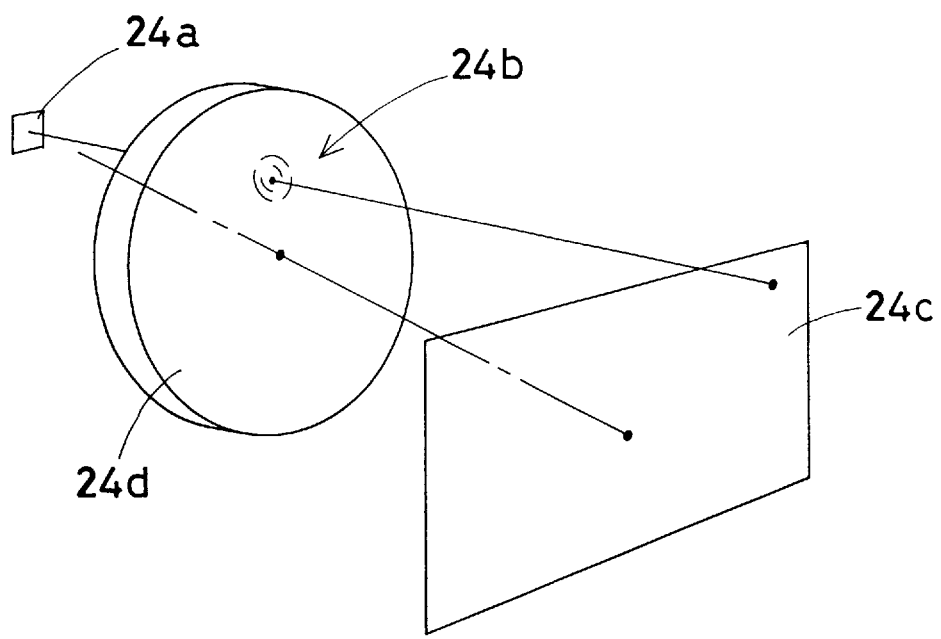
FIG. 18 is a conceptual view showing a data imprinting optical system according to Example 18 of the present invention.

FIG. 18 is a conceptual view showing a data imprinting optical system according to Example 18 of the present invention. Example 18 is an example of application of Example 17. In this example, a diffractive optical element provided within an optical surface of a taking lens is used to effect imprinting of data. In the figure, reference character 24a denotes a display device that displays data; 24b denotes a diffractive optical element having an image-forming action; 24c denotes a film surface; and 24d denotes a part of a photographic optical system that forms an image of a subject on the film surface 24c. The diffractive optical element 24b and the part 24d of the photographic optical system are integrated into one unit by providing a diffraction surface of a resin material on a lens made of a glass material. The diffractive optical element 24b is disposed within the optical surface of the part 24d of the photographic optical system. Data displayed on the display device 24a is imaged on the film surface 24c through the diffractive optical element 24b.

The use of the above-described diffractive optical element makes it possible to obtain advantageous effects similar to those in Example 17. If the diffractive optical element 24b is disposed outside the effective area of the part 24d of the photographic optical system, the data imprinting optical system can be constructed without affecting the performance of the photographic optical system. If the diffractive optical element 24b is disposed within the effective area of the part 24d of the photographic optical system, the space required to dispose the data imprinting optical system becomes smaller than in a case where the diffractive optical element 24b is disposed outside the effective area. Therefore, it is possible to contribute to achievement of a reduction in the size of the camera.

It is preferable from the viewpoint of facilitating imprinting of data that each of the parts 23d and 24d of the photographic optical systems in Examples 17 and 18 should be a lens that is the closest to the image plane.

EXAMPLE 19

FIG. 19 is a conceptual view showing a data imprinting optical system according to Example 19 of the present invention. Example 19 is an example of application of Example 17. In this example, a diffractive optical element that is integral with a part of a finder optical system is used to effect imprinting of data. In the figure, reference character 25a denotes a display device that displays data; 25b denotes a diffractive optical element having both an image-forming action and an optical axis changing action; 25c denotes a film surface; and 25d denotes a part of a finder optical system that assumes a part of the function of leading an image of a subject to the field of view. The diffractive optical element 25b and the part 25d of the finder optical system are integrally molded of a plastic material. Data displayed on the display device 25a is imaged on the film surface 25c through the diffractive optical element 25b.

The use of the above-described diffractive optical element makes it possible to obtain advantageous effects similar to those in Example 17. Because the finder optical system can be disposed independently of the position of the film, the imprint position can be adjusted, and the data imprinting optical system can be disposed with a higher degree of freedom than in a case where it is integrated with the taking lens. Therefore, the integral structure causes no reduction in the degree of freedom with which the data imprinting optical system can be disposed in a camera. Accordingly, it is possible to contribute to achievement of a reduction in the size of the camera.

It should be noted that the above-described examples may be arranged as follows:

Regarding the diffractive optical elements, all the optical surfaces, including the reflecting surface of the prism, are preferably formed from approximately plane surfaces. By doing so, the lenses (diffractive optical elements) become small in size.

As has been stated in connection with Example 1, a diffraction surface having a positive power may be disposed on a convex refracting surface. In this case also, the lens becomes thinner than the conventional one. Incidentally, if the positive power of a diffraction surface is excessively strong, the diffraction grating pitch becomes very small, and it becomes difficult to produce the desired diffraction surface. However, the above-described arrangement enables the convex refracting surface to share the positive power of the diffraction surface. Therefore, the power of the diffraction surface can be weakened, and thus the diffraction grating pitch may be relatively coarse. Accordingly, it becomes easy to produce the diffraction surface.

It is also possible to dispose a diffraction surface having a negative power on a concave refracting surface. With this arrangement, the curvature of the concave surface can be weakened by assigning a part of the negative power of the refracting surface to the diffraction surface. Therefore, in the case of a negative lens, the thickness of the edge of the lens can be reduced in comparison to the conventional lens. In a case where the negative power of the diffraction surface is excessively strong, a part of the negative power of the diffraction surface can be assigned to the concave refracting surface. Therefore, the power of the diffraction surface can be weakened, and the diffraction grating pitch may be relatively coarse. Accordingly, it becomes easy to produce the diffraction surface.

The diffractive optical element may have a plurality of diffraction surfaces. In this case, each diffraction surface can be assigned a part of the necessary action or given each of different actions. Therefore, the degree of design freedom increases.

In particular, the arrangement may be such that one of two diffraction surfaces is given a positive power and the other surface is given a negative power to change the positions of the principal points of the optical system. In this case, it is possible to increase the degree of freedom with which the optical system can be disposed in a camera.

The diffraction surface of the diffractive optical element is preferably formed with a sawtooth sectional configuration, known as "kinoform", such as that shown in FIG. 20(a). The diffraction surface may also be produced as any of binary optics such as those shown in FIGS. 20(b) to 20(d), which are obtained by approximating the kinoform.

As the power of the diffraction surface is increased, the sawtooth pitch difference between the central and peripheral portions increases in order to improve the diffraction efficiency of the same order. Consequently, the diffraction surface may become difficult to produce. In this case, the central portion and the peripheral portion may be made different from each other in order of diffraction such that the first-order diffraction efficiency is maximized at the central portion, and the second-order diffraction efficiency is maximized at the peripheral portion.

It is preferable that the display device should be formed from an LED, a liquid crystal display device, etc. and display light-emitting points or data. It is preferable to use a light source of monochromatic light.

In a case where a plurality of different data imprinting modes are available, a desired optical path may be selected by moving a light-blocking member to block the other optical path or paths. Alternatively, a desired optical path may be selected by electrically blocking the other optical path or paths using a liquid crystal shutter.

Further, in a case where a plurality of different data imprinting modes are available, the imprinting modes may be switched by moving the diffractive optical element such that the image-formation point or points for the unwanted imprinting mode or modes lie outside the film surface, which is the surface to be imprinted with data. This arrangement needs no optical path selecting member and is therefore advantageous from the viewpoint of cost.

It is preferable to arrange the system such that the imprinting modes are switched over from one to another in response to the movement of a light-blocking member that changes the aspect ratio of the image frame for panoramic photography, for example.

As will be clear from the foregoing description, the present invention makes it possible to provide a space-saving data imprinting optical system which is capable of imprinting date or other information on a film surface used in a camera, for example. Therefore, it is possible to reduce the size of the camera. In a case where the data imprinting optical system is arranged to enable a plurality of different data imprinting modes, the number of constituent members can be reduced. Thus, it is possible to achieve a reduction in the cost.

What we claim is:

1. In a data imprinting optical system having a display device and arranged to imprint an image displayed on said display device onto a predetermined surface,
the improvement which comprises at least one diffractive optical element.

2. In a data imprinting optical system having a display device and arranged to imprint an image displayed on said display device onto a predetermined surface,
the improvement which comprises at least one diffractive optical element,
said at least one diffractive optical element having a diffracting action by which a direction of an optical axis is changed.

3. A data imprinting optical system according to claim 1 or 2, which comprises one diffractive optical element.

4. A data imprinting optical system according to claim 2, wherein a plurality of diffractive optical elements are disposed on a same optical axis.

5. A data imprinting optical system according to claim 2, which has a plurality of optical paths having different image-formation relationships with respect to one display device, and which has at least one diffractive optical element in each optical path, wherein a data imprinting mode is selected by selecting one of said optical paths.

6. In a data imprinting optical system having a display device and arranged to imprint an image displayed on said display device onto a predetermined surface,
the improvement which comprises at least one diffractive optical element,
said at least one diffractive optical element having at least one reflecting surface.

7. A data imprinting optical system according to claim 6, wherein said at least one reflecting surface and a diffraction surface are disposed on different surfaces.

8. A data imprinting optical system according to claim 7, wherein said at least one diffractive optical element is a prism.

9. A data imprinting optical system according to claim 6, wherein said at least one reflecting surface is provided with a diffraction surface.

10. A data imprinting optical system according to claim 9, wherein said at least one diffractive optical element is a surface-coated reflecting member.

11. A data imprinting optical system according to claim 9, wherein said at least one diffractive optical element is a back-coated reflecting member.

12. A data imprinting optical system according to claim 9, wherein said at least one diffractive optical element is a prism.

13. A data imprinting optical system according to claim 7, wherein said at least one diffractive optical element has a diffraction surface and a reflecting surface which is different from said diffraction surface, and wherein said at least one diffractive optical element is arranged such that an optical axis of said data imprinting optical system passes through said diffraction surface and is then reflected by said reflecting surface, and the reflected optical axis repasses through said diffraction surface.

14. In a data imprinting optical system having a display device and arranged to imprint an image displayed on said display device onto a predetermined surface,
the improvement which comprises at least one diffractive optical element,
said at least one diffractive optical element having a plurality of different image-formation points to enable a plurality of different data imprinting modes.

15. A data imprinting optical system according to claim 14, wherein said at least one diffractive optical element has a plurality of image-formation points different in order of diffraction from each other, so that a data imprinting mode is selected by selecting one of optical paths to said plurality of image-formation points.

16. A data imprinting optical system according to claim 14, wherein said at least one diffractive optical element has a diffraction surface having a plurality of areas different in grating period from each other, said areas having respective image-formation points, so that a data imprinting mode is selected by selecting one of optical paths passing through said areas, respectively.

17. A data imprinting optical system according to claim 15 or 16, wherein when imprinting of data is performed at at least one of said image-formation points, at least an optical member that forms said data imprinting optical system is moved in a direction of an optical axis.

18. A data imprinting optical system according to claim 15 or 16, wherein when imprinting of data is performed at at least one of said image-formation points, an optical member that forms said data imprinting optical system is rotated around an axis perpendicular to an optical axis and parallel to the surface to be imprinted with data.

19. A data imprinting optical system according to claim 15 or 16, further comprising at least one optical member that is disposed on an optical axis of at least one of said optical paths.

20. In a data imprinting optical system having a display device and arranged to imprint an image displayed on said display device onto a predetermined surface, the improvement which comprises at least one diffractive optical element, said at least one diffractive optical element being integral with a part of another optical system.

21. A data imprinting optical system according to claim 20, wherein said at least one diffractive optical element has a diffracting action by which a direction of an optical axis is changed.

22. A data imprinting optical system according to claim 20, wherein said another optical system is a photographic lens system.

23. A data imprinting optical system according to claim 20, wherein said another optical system is a finder optical system.

24. A data imprinting optical system according to claim 20, wherein said at least one diffractive optical element is disposed outside an optical surface of said another optical system.

25. A data imprinting optical system according to claim 20, wherein said at least one diffractive optical element is disposed within an optical surface of said another optical system.

26. A data imprinting optical system according to claim 25, wherein said at least one diffractive optical element is disposed outside an effective area of said another optical system.

27. A data imprinting optical system according to claim 25, wherein said at least one diffractive optical element is disposed within an effective area of said another optical system.

28. A data imprinting optical system according to claim 1, 2, 6, 14 or 20, wherein all optical surfaces of said at least one diffractive optical element are approximately plane surfaces.

29. A data imprinting optical system according to claim 1, wherein said at least one diffractive optical element has a diffraction surface on a convex surface, said diffraction surface having a positive power.

30. A data imprinting optical system according to claim 1, wherein said at least one diffractive optical element has a diffraction surface on a concave surface, said diffraction surface having a negative power.

31. A data imprinting optical system according to claim 1, wherein said at least one diffractive optical element has at least two diffraction surfaces.

32. A data imprinting optical system according to claim 1, wherein said at least one diffractive optical element has at least two diffraction surfaces including a diffraction surface having a positive power and a diffraction surface having a negative power.

33. A data imprinting optical system according to claim 1, wherein said at least one diffractive optical element has at least two diffraction surfaces including a diffraction surface having a positive power and a diffraction surface having a negative power, and principal points lie outside said at least one diffractive optical element.

34. A data imprinting optical system according to claim 1, wherein said at least one diffractive optical element is constructed and arranged such that principal points lie outside said at least one diffractive optical element.

* * * * *